United States Patent
Takano et al.

(10) Patent No.: US 9,102,383 B2
(45) Date of Patent: Aug. 11, 2015

(54) AIR LUBRICATION SYSTEM OF SHIP

(75) Inventors: Shinichi Takano, Tokyo (JP); Shuji Mizokami, Tokyo (JP); Seijiro Higasa, Tokyo (JP); Chiharu Kawakita, Tokyo (JP); Makoto Kawabuchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/806,410

(22) PCT Filed: Mar. 29, 2011

(86) PCT No.: PCT/JP2011/057788
§ 371 (c)(1),
(2), (4) Date: Dec. 21, 2012

(87) PCT Pub. No.: WO2012/042947
PCT Pub. Date: Apr. 5, 2012

(65) Prior Publication Data
US 2013/0139746 A1    Jun. 6, 2013

(30) Foreign Application Priority Data

Sep. 27, 2010    (JP) .................................. 2010-216125

(51) Int. Cl.
*B63B 1/38*    (2006.01)

(52) U.S. Cl.
CPC ............. *B63B 1/38* (2013.01); *B63B 2001/387* (2013.01); *Y02T 70/122* (2013.01); *Y10T 29/49716* (2015.01)

(58) Field of Classification Search
CPC .. B63B 2001/387; B63B 1/38; Y02T 70/122; Y02T 70/121
USPC .................................................. 114/67 A, 289
See application file for complete search history.

(56) References Cited

U.S. PATENT DOCUMENTS

| | | | | |
|---|---|---|---|---|
| 1,697,257 A | * | 1/1929 | Anissimoff | 114/67 A |
| 3,084,651 A | * | 4/1963 | Parmenter | 181/235 |
| 3,289,623 A | * | 12/1966 | Gray et al. | 114/67 A |
| 3,650,235 A | * | 3/1972 | Swanson | 114/67 A |
| 5,967,071 A | | 10/1999 | Wipper | |

FOREIGN PATENT DOCUMENTS

| | | |
|---|---|---|
| CN | 1280540 | 1/2001 |
| EP | 2 272 747 | 1/2011 |

(Continued)

OTHER PUBLICATIONS

International Search Report issued Jul. 5, 2011 in International (PCT) Application No. PCT/JP2011/057788.
Korean Office Action issued Jan. 10, 2014 in corresponding Korean Patent Application No. 10-2012-7034014 with partial English translation.

(Continued)

*Primary Examiner* — Edwin Swinehart
(74) *Attorney, Agent, or Firm* — Wenderoth, Lind & Ponack, L.L.P.

(57) ABSTRACT

A ship air lubrication system of an external installation type has good efficiency. An air ejecting unit includes an ejecting side chamber installed in a ship bottom of a ship and having air ejecting holes formed in a surface opposite to the ship bottom on a lower side, and a supply section which supplies air into an inner space of the ejecting side chamber. When the air in the ejecting side chamber is ejected from the air ejecting holes, the air is sheared by an external water stream, and small air bubbles are supplied to the ship bottom.

7 Claims, 7 Drawing Sheets

(56) References Cited

FOREIGN PATENT DOCUMENTS

| | | |
|---|---|---|
| JP | 2000-296795 | 10/2000 |
| JP | 2001-524421 | 12/2001 |
| JP | 2009-248611 | 10/2009 |
| JP | 2009-248831 | 10/2009 |
| JP | 2009-274713 | 11/2009 |
| JP | 2010-120607 | 6/2010 |
| KR | 10-2001-0032664 | 12/2002 |
| WO | 99/28180 | 6/1999 |
| WO | 2004/074084 | 9/2004 |
| WO | 2009/122736 | 10/2009 |
| WO | 2010/058614 | 5/2010 |

OTHER PUBLICATIONS

International Preliminary Report on Patentability and Written Opinion of the International Searching Authority issued Apr. 16, 2013 in International (PCT) Application No. PCT/JP2011/057788.
Chinese Office Action and Search Report issued Sep. 25, 2014 in corresponding Chinese patent application No. 201180032233.4 with English translation.
Extended European search report issued Oct. 6, 2014 in corresponding European patent application No. 11828509.7.
Korean Decision for Grant of Patent issued Jan. 5, 2015 in corresponding Korean Patent Application No. 2012-7034014 with partial English translation.

* cited by examiner

AIR LUBRICATION SYSTEM OF SHIP

TECHNICAL FIELD

The present invention relates to a technique of supplying air bubbles to decrease a resistance between a ship and water. This application claims a priority based on Japanese Patent Application No. JP 2010-216125 filed on Sep. 27, 2010. The disclosure thereof is incorporated herein by reference.

BACKGROUND ART

As a technique of improving an efficiency of navigation of a ship, an air lubrication system is known. The air lubrication system is a technique for supplying air bubbles to an outer plate of the ship below a water line to reduce the friction between the ship and water and further improving the efficiency of the navigation. The technique described in JP 2009-248831A is its one example.

CITATION LIST

[Patent Literature 1] JP 2009-248831A

SUMMARY OF THE INVENTION

The inventor of the present invention is developing a technique of modifying an existing ship to install the air lubrication system externally to improve the efficiency of the navigation. In such a technique, it is demanded that the modification is easy and the reduction of frictional resistance is effective.

In a view of the present invention, the air ejecting unit includes an ejecting side chamber installed in a ship bottom of a ship and having air ejecting holes formed on a surface opposite to the ship bottom on a lower side; and a supply section which supplies air into an inner space of the ejecting side chamber.

In another view of the present invention, the supply section is arranged in a different position from the air ejecting holes in a longitudinal direction of the ship.

In another view of the present invention, the supply section of the air ejecting unit supplies air to the inner space from an air supply hole formed in the ship bottom on a bow side from the air ejecting holes. The ejecting side chamber has an air diffusing section extending in the longitudinal direction of the ship between the air supply hole and the air ejecting holes to diffuse the air supplied from the supply section.

In another view of the present invention, the air ejecting holes are distributed in a wider area in a width direction of the ship than the air supply hole.

In another view of the present invention, the air ejecting unit further includes a diffusing member installed in a position on a bow side from the air ejecting holes and on a stern side from the air supply hole in the inner space and diffusing the air supplied from the air supply hole to supply to the air ejecting holes.

In another view of the present invention, a ship is provided with the air ejecting unit of the present invention installed in the ship bottom.

In a view of the present invention, an air lubrication system includes the air ejecting unit of the present invention; and an air recovering unit. The air recovering unit includes a recovering side chamber installed in the ship bottom on the stern side from the air ejecting unit and having air intake holes formed in a surface opposite to the ship bottom on a lower side; and a recovering section which recovers the air in the recovery side chamber.

In another view of the present invention, the recovery section recovers the air in the recovering side chamber from the air recovery hole formed in the ship bottom on the stern side from the air intake holes. The recovering side chamber includes an air accumulation section extending in the longitudinal direction of the ship to accumulate and recover the air acquired by the air intake holes from the air recovery hole.

In anther view of the present invention, the air intake holes are distributed in a wider area in the longitudinal direction of the ship than the air recovery hole.

In another view of the present invention, the air lubrication system further includes a guide plate arranged in the recovering side chamber and inclined to the ship bottom from the opposite surface in a direction from the air intake holes to the air recovery hole.

In another view of the present invention, the recovering side chamber has a shape symmetrical to the ejecting side chamber of an air ejecting unit with respect to a reference line in the width direction of the ship.

In a view of the present invention, a ship has the air lubrication system installed in the ship bottom.

In a view of the present invention, a method of altering a ship, includes installing an ejecting side chamber which has air ejecting holes in a surface opposite to a ship bottom on a lower side, in the ship bottom; and forming a supply section which supplies air into the ejecting side chamber.

In another view of the present invention, the supply section is arranged in a different position in a longitudinal direction of the ship from the air ejecting holes.

In another view of the present invention, the altering method further includes installing a recovering side chamber including air intake holes in a surface opposite to the ship bottom on the lower side, in the ship bottom on a stern side from the air ejecting unit; and forming a recovery section which recovers the air inside the recovering side chamber.

According to the present invention, an air ejecting unit, an air lubrication system and a ship altering method are provided to have the great reduction effect of friction resistance.

Moreover, according to the present invention, in the air lubrication system externally installed to a ship, the air ejecting unit, an air lubrication system and the ship altering method which are relatively easy in the altering, are provided.

BRIEF DESCRIPTION OF THE DRAWINGS

The above-mentioned objects, other objects, effects and features of the present invention will be clarified by the description of embodiments in conjunction with the following drawings.

DESCRIPTION OF EMBODIMENTS

Figure 1:
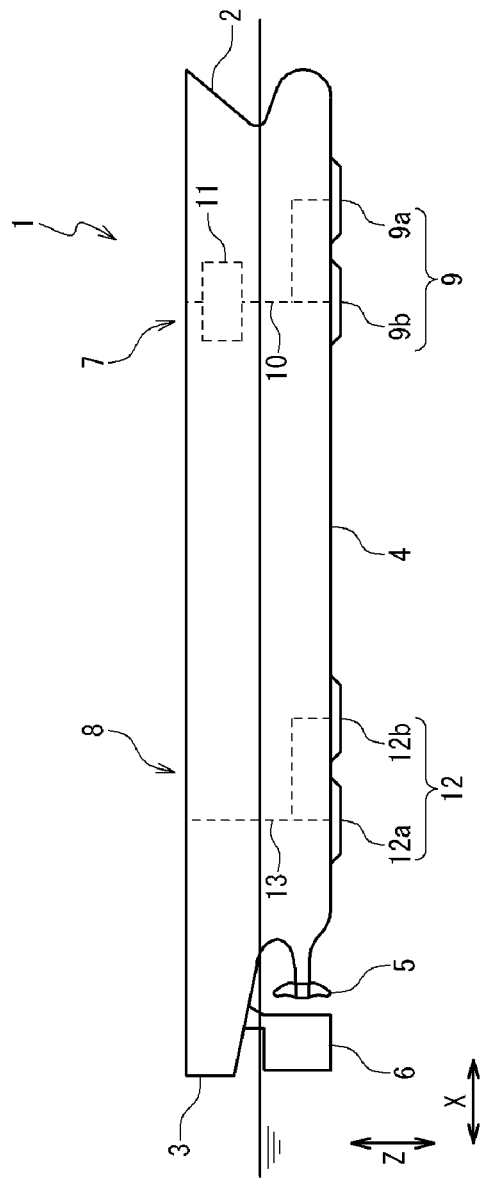
FIG. 1 is a side view of a ship.
Figure 2:
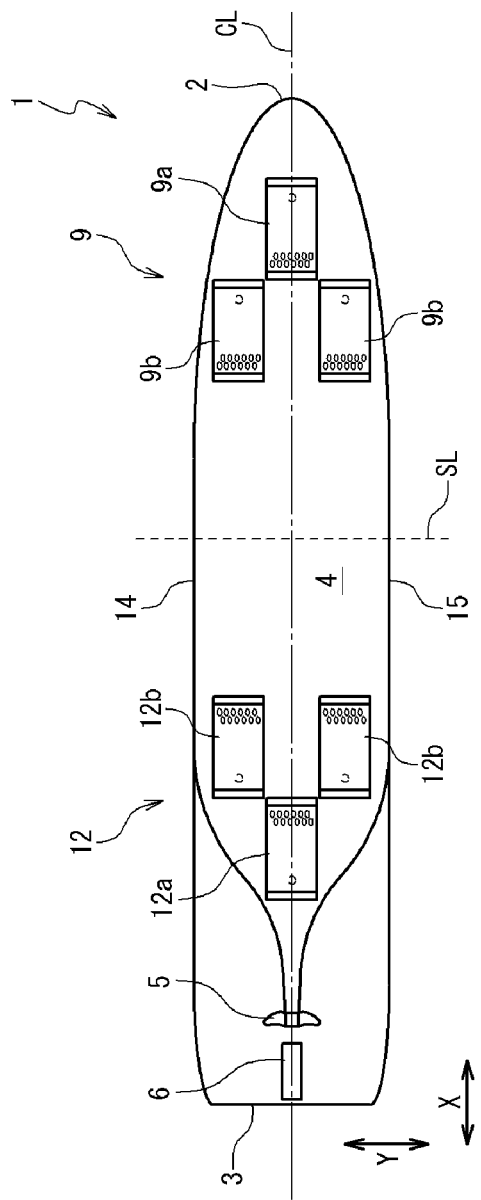
FIG. 2 is a bottom view of the ship.

Hereinafter, embodiments of the present invention will be described in detail with reference to the attached drawings. FIG. 1 is a side view of a ship to which an air ejecting unit, an air lubrication system and an altering method according to an embodiment of the present invention are applied. FIG. 2 is a bottom view when the ship is viewed from a ship bottom. A bow 2 of a hull 1 is drawn on a right side, and a stern 3 is drawn on a left side. A screw propeller 5 and a helm 6 are provided below a water level on the side of the stern 3. An air ejecting unit 7 is provided on a side closer to the bow 2 on a ship bottom 4. An air recovering unit 8 is provided on a side closer to the stern 3 on the ship bottom 4.

The air ejecting unit 7 contains an ejecting side chamber 9 installed in the ship bottom 4, a pipe 10 and a compressor 11. A blower may be used instead of the compressor 11. The compressor 11 blows-off the air inside the pipe 10 into the direction of the ship bottom 4. One end of the pipe 10 is connected to an air supply hole (to be described later) formed on an outer plate of the ship bottom 4. The ejecting side chamber 9 is attached to the ship bottom 4 in a position at which the air supply hole is opened, by welding or fastening bolts. The air inside the pipe 10 is supplied into the ejecting side chamber 9 by the compressor 11.

The air recovering unit 8 contains a recovering side chamber 12 and a pipe 13. One end of the pipe 13 is connected to an air recovery hole (to be described later) formed on the outer plate of the ship bottom 4. The recovering side chamber 12 is installed in the ship bottom 4 in a position at which the air recovery hole is opened, by welding or fastening bolts. The air inside the recovering side chamber 12 is discharged through the pipe 13 to the outside or again supplied to the pipe 10 on the side of the air ejecting unit 7.

In an example of FIGS. 1 and 2, a plurality of (three) ejecting side chambers 9 are attached. An ejecting side chamber 9a on a front side is attached on a central line CL of the hull 1, line-symmetrically with respect to the central line CL. One of ejecting side chambers 9b on a rear side is attached to a position shifted to a starboard side 14, in parallel to the ejecting side chamber 9a on the front side. The other is attached to a position shifted to a portside 15, in parallel to the ejecting side chamber 9a on the front side. Thus, the ejecting side chambers 9b on the rear side are formed symmetrically with respect to the central line CL.

In the example of FIGS. 1 and 2, a plurality of recovering side chambers 12 are provided in correspondence with to the ejecting side chambers 9. Recovering side chambers 12a and 12b on the front side and the rear side are attached in correspondence with to the ejecting side chambers 9a and 9b on the front side and the rear side. Each of the recovering side chambers 12 is provided to have a shape similar to the ejecting side chamber 9 and in an orientation opposite to the front to rear direction of the hull 1. As a result, the ejecting side chambers 9 and the recovering side chambers 12 are configured to be line-symmetrical with respect to a reference line SL extending in a lateral direction of the hull 1.

Figure 3:
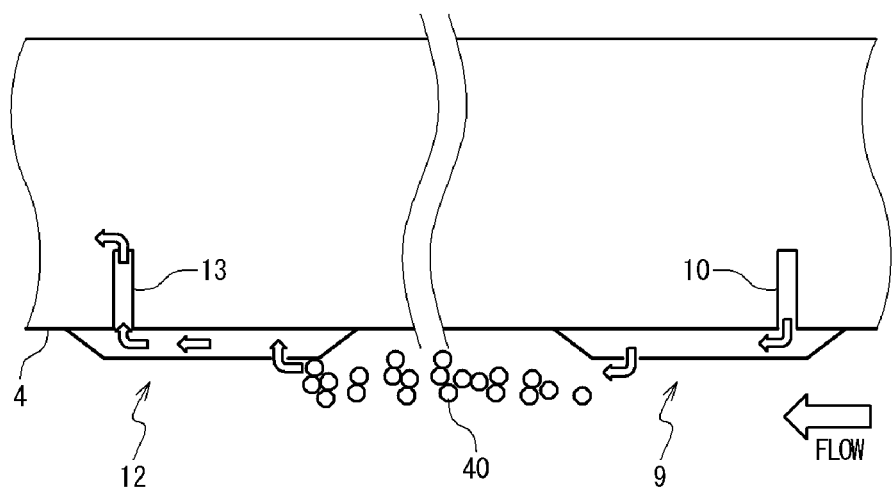
FIG. 3 a diagram schematically showing an operation of an air lubrication system.

FIG. 3 schematically shows an operation of the air lubrication system. The air is supplied from the pipe 10 to the ejecting side chamber 9. The ejecting side chamber 9 ejects the air to external water as air bubbles 40. The air bubbles 40 flow to the side of the stern 3 while covering the ship bottom 4. Because the ship bottom 4 is covered with the air bubbles 40, friction between the hull 1 and the water is reduced. The air bubbles 40 are acquired by the recovering side chamber 12 and recovered from the pipe 13. The air bubbles 40 are recovered at the side of the bow 2 from the propeller 5. Thus, it is possible to avoid the reduction of propulsion efficiency of the propeller 5 caused by the air bubbles 40.

Figure 4:
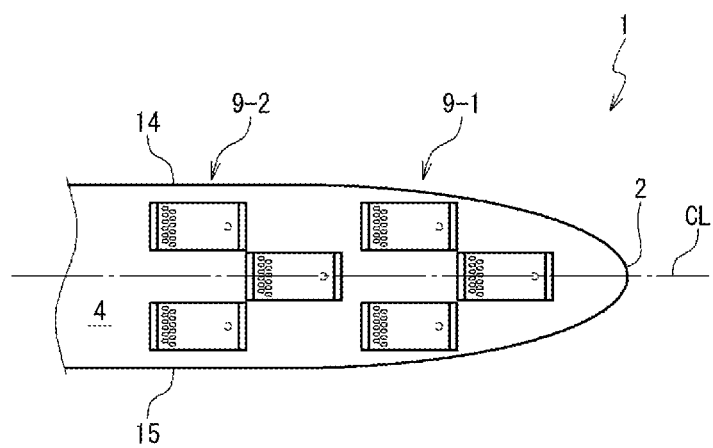
FIG. 4 is a diagram showing another configuration example of an ejecting side chamber.

FIG. 4 shows another configuration example of the ejecting side chambers 9. In the configuration shown in FIG. 2, the air bubbles 40 that substantially cover the ship bottom 4 in the width direction are provided by the three ejecting side chambers 9. In FIG. 4, in addition to a group of three ejecting side chambers 12-1 that substantially covers the ship bottom 4 in the width direction, another group of three ejecting side chambers 12-2 that have the similar configuration are further provided at a shifted position in a longitudinal direction of the hull 1. In this configuration example, a larger number of the air bubbles 40 can be supplied to the ship bottom 4. Or, in case that the air bubbles 40 easily escape from both the end portions of the ship bottom 4 in the width direction, when the air bubbles 40 supplied from the ejecting side chambers 12-1 come short on the side of the stern 3, the air bubbles 40 can be supplemented from the ejecting side chambers 12-2 of a next stage. In such a case, the air bubbles 40 can be recovered by providing a plurality of groups of ejecting side chambers 12-1 and 12-2 and a group of recovering side chambers, which are configured line-symmetrical on the side of the stern 3 with respect to the predetermined standard line SL.

Figure 5:
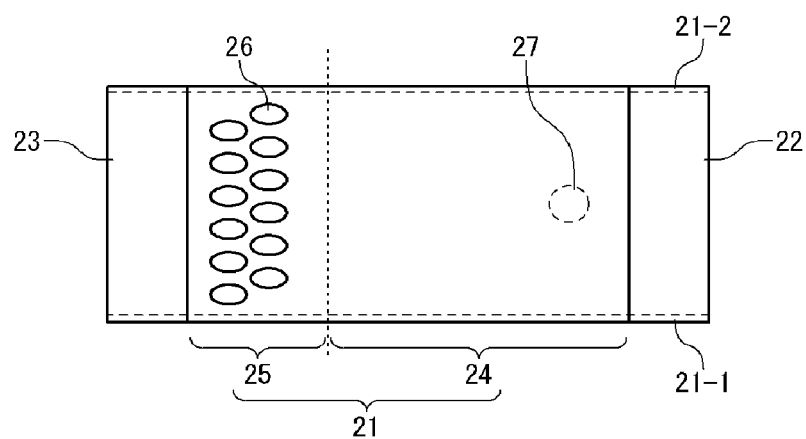
FIG. 5 is a bottom view of the ejecting side chamber.
Figure 6:
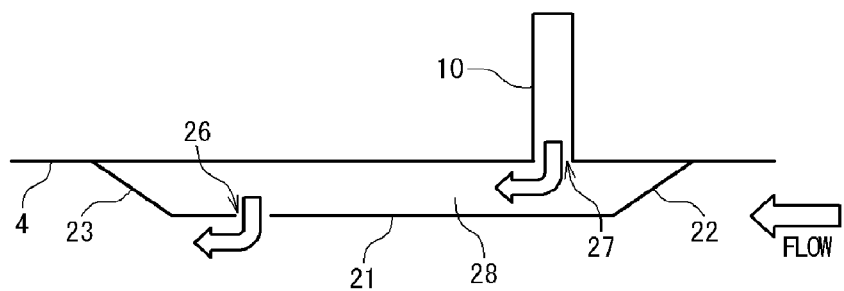
FIG. 6 is a side sectional view of the ejecting side chamber.

The configuration of the ejecting side chambers 9 will be described below. FIG. 5 is a bottom view of the ejecting side chamber 9. FIG. 6 is a sectional side view of the ejecting side chamber 9. The right side in each of FIGS. 5 and 6 indicates the side of the bow 2. The ejecting side chamber 9 contains a flat section 21, a front end 22, a rear end 23, a side plate 21-1 and a side plate 21-2. The flat section 21 is a plate member provided on the lower side of the ship bottom 4 to have a gap. The flat section 21 is arranged in parallel to the ship bottom 4 or at an angle close to the state parallel to the ship bottom 4 to oppose to the ship bottom 4.

The front end 22 is a plate member for connecting the ship bottom 4 and the end of the flat section 21 on the side of the bow 2. The front end 22 has a slope that approaches the ship bottom 4 toward the side of the bow 2, in order to decrease the resistance of water flow when the hull 1 navigates forwardly. The rear end 23 is a plate member for connecting the ship bottom 4 and the end of the flat section 21 on the side of the stern 3. The rear end 23 has a slope which approaches the ship bottom 4 toward the side of the stern 3, in order to suppress the generation of eddies functioning as resistance when the hull 1 navigates forwardly and which further smoothly guide the air bubbles to the ship bottom 4. The side plate 21-1 closes an opening formed by the ship bottom 4 and the ends of the flat section 21, the front end 22 and the rear end 23 on the portside side. The side plate 21-2 closes an opening formed by the ship bottom 4 and the ends of the flat section 21, the front end 22 and the rear end 23 on the starboard side. An air bubble room 28 is formed by the flat section 21, the front end 22, the rear end 23, the side plates 21-1 and 21-2 and the ship bottom 4 covered with them. The air bubble room 28 is a space communicated with the water under a water surface through air ejecting holes 26, when the hull 1 is floating, and also the air bubble room 28 is communicated to the pipe 10 through an air supply hole 27, and the other portions of the air bubble room 28 except it are closed.

In relation to the design of the ejecting side chamber 9, the flat section 21 is divided into an air diffusing section 24 that is a region on the side of the bow 2; and an air ejecting section 25 that is a region on the side of the stern 3, by a dotted line of FIG. 5 as a boundary. A plurality of air ejecting holes 26 are formed in the air ejecting section 25. These air ejecting holes 26 are formed to be arranged in the width direction of the hull 1. In an example of FIG. 5, the air ejecting holes 26 of two lines are arranged in a zigzag manner in a longitudinal direction of the hull 1.

The air supply hole 27 is formed in a position differing from the air ejecting holes 26 (a position on the side of the bow 2 in FIGS. 5 and 6), on the ship bottom 4 opposite to the air diffusing section 24. One end of the pipe 10 is connected to the air supply hole 27. The air diffusing section 24 is provided between the air supply hole 27 and the air ejecting holes 26 to give a predetermined distance in the longitudinal direction of the hull 1. This distance enables the air supplied from the air supply hole 27 to diffuse into the air bubble room 28 and consequently enables the air bubbles of a substantially uniform quantity to be ejected into the water from the plurality of air ejecting holes 26 arranged in the width direction of the hull 1. In order to attain the effect of the air diffusing section 24, for example, a distance between a center of the air supply hole 27 and a center of the air ejecting holes 26 is desired to be set longer than the width of the air bubble room 28.

By a pressure given by the compressor 11, the air supplied from the air supply hole 27 to the air bubble room 28 is impinged on the upper surface (inner wall surface) of the flat section 21. The supplied air is changed into the fine air bubbles by the pressure of this impingement, and the width of a distribution is easily widened. While the air bubbles are pushed out to a downstream side inside the air diffusing section 24, its distribution is expanded in the width direction.

Because the air diffusing section 24 is provided, the width of the air supply hole 27 can be made smaller than a lateral distribution of the air ejecting holes 26 in the width direction of the hull 1. In other words, by providing the air diffusing section 24, because the air ejecting holes 26 are formed so as to be distributed in the wide region in the lateral direction of the hull 1, the air bubbles 40 can be ejected in the substantially uniform distribution, even in case that the number of air supply hole 27 is small (one in an example of FIG. 5). Thus, in case where the ship is altered to install the air lubrication system later, a work quantity may be reduced when the air supply hole 27 and the pipe 10 are arranged in the hull 1.

A diffusion member for diffusing the air bubbles may be further added to the ejecting side chamber 9. For example, a porous plate provided between the air supply hole 27 and the air ejecting holes 26 divides the air bubble room 28 in the longitudinal direction of the hull 1, so that the finer air bubbles can be supplied to the air ejecting holes 26.

When a certain quantity of air is accumulated inside the air bubble room 28, the air bubbles 40 are pushed out into the water under the ship bottom 4 from the air ejecting holes 26. When the ship is navigating, the hull 1 sails forwardly against the water. The water flow has a main direction from the front end 22 of the ejecting side chamber 9 to the rear end 23 on the ship bottom 4. On the other hand, because the inner space of the ejecting side chamber 9 is a relatively closed space, the flows of the water and air in the air bubble room 28 are slow, as compared with the water flow in the outside. For this reason, when the air in the air bubble room 28 is ejected from the air ejecting holes 26 to the outside, the air bubbles are sheared into the finer air bubbles 40 by shearing force of the water flow and sent to the downstream side. The finer air bubbles 40 stay on the ship bottom 4 for a long time. Thus, the high air lubrication effect is obtained. In this way, the air is not directly supplied from the air supply hole 27 to the ship bottom 4 but the air from the air supply hole 27 once stays in the air bubble room 28 by the rear end 23 and then is ejected to the ship bottom 4 so that the shearing force acts against the air. Thus, the air bubbles 40 suitable for the air lubrication are obtained.

Through the design of the shape of the air ejecting holes 26, the air bubbles 40 can be ejected more smoothly to the water flows whose speeds are different, in the longitudinal direction of the hull 1 from the air bubble room 28. In an example of FIG. 5, each of the air ejecting holes 26 is long and oval in the main direction of the flow, namely, in the longitudinal direction of the hull 1. The air bubbles 40 ejected from the air ejecting hole 26 rise along the rear end 23 and flow to the stern 3 while covering the ship bottom 4, and then arrives at the recovering side chambers 12.

Figure 7:
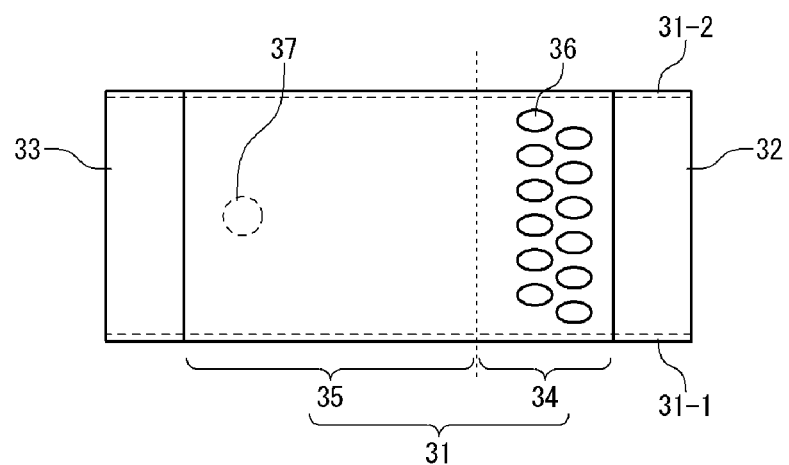
FIG. 7 is a bottom view of a recovering side chamber.
Figure 8:
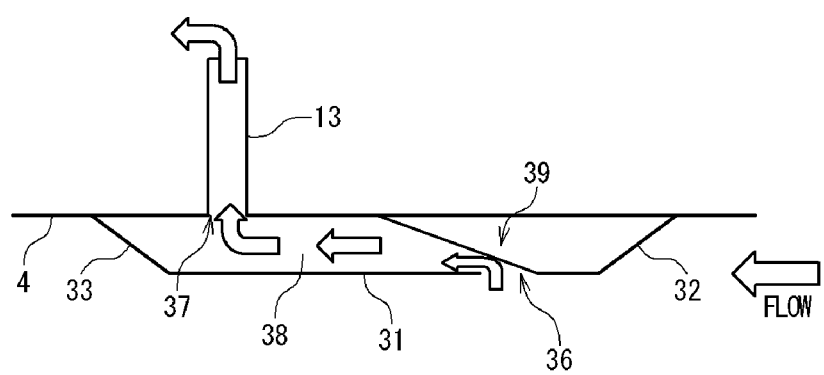
FIG. 8 is a side sectional view of the recovering side chamber.

The configuration of the recovering side chamber 12 will be described below. FIG. 7 is a bottom view of the recovering side chamber 12. FIG. 8 is a sectional side view of the recovering side chamber 12. The right side of each of FIGS. 7 and 8 is the side of the bow 2. The recovering side chamber 9 has a shape similar to the ejecting side chamber 9, and this is attached to the ship bottom 4 in the orientation opposite to the longitudinal direction of the hull 1. The recovering side chamber 12 contains a flat section 31, a front end 32, a rear end 33 and side plates 31-1 and 31-2. The flat section 31 is a plate member provided on the lower side of the ship bottom 4 and arranged parallel and opposite to the ship bottom 4 to have a gap.

The front end 32 is a plate member for connecting the ship bottom 4 and the end of the flat section 31 on the side of the bow 2. The front end 32 has a slope that approaches the ship bottom 4 toward the side of the bow 2, in order to decrease the resistance of the water flow when the hull 1 navigates forwardly. The rear end 33 is a plate member for connecting the ship bottom 4 and the end of the flat section 31 on the side of the stern 3. The rear end 33 has a slope that approaches the ship bottom 4 toward the side of the stern 3, in order to suppress the generation of the eddies that serves as the resistance when the hull 1 navigates forwardly. The side plates 31-1 and 31-2 close the openings of the recovering side chamber 12 on the portside and starboard side, similarly to the side plates 21-1 and 21-2 of the ejecting side chamber, to form the air bubble room 38. The air bubble room 38 is a space communicating with the water under the water surface where the hull 1 floats, through air intake holes 36 and also communicated with the pipe 13 through an air recovery hole 37. The other portions of the air bubble room 38 except them are closed. The recovering side chamber 12 having such a configuration can be attained by providing a member for the ejecting side chamber 9 on the ship bottom 4, in an orientation opposite to the longitudinal direction of the hull 1.

In the design of the recovering side chamber 12, the flat section 31 is divided into an air intake section 34 that is a region on the side of the bow 2, and a pushing pressure generating section 35 that is a region on the side of the stern 3, with respect to a dotted line of FIG. 7 as a boundary. A plurality of air intake holes 36 are formed in the air intake section 34, similarly to the air ejecting holes 26 of the ejecting side chamber 9.

An air recovery hole 37 is formed a position of the ship bottom 4 on the side opposite to the pushing pressure generating section 35. One end of the pipe 13 is connected to the air recovery hole 37. By the pushing pressure generating section 35, it is possible to form the air bubble room 38 having a certain degree of a volume. The air bubbles acquired from the air intake holes 36 stay in the air bubble room 38. The air bubbles once stay in the pushing pressure generating section 35, so that the mass of the air of some quantity is accumulated in the air bubble room 38. As a result, the air bubbles can be smoothly recovered from the air recovery hole 37.

In order to suppress the resistance of the water, the thickness of the recovering side chamber 12 is desired to be thin. Because the length of the pushing pressure generating section 35 is set long, the sufficient volume of the air bubble room 38 can be ensured even if the recovering side chamber 12 is thin. For this reason, for example, similarly to the ejecting side chamber 9, a distance between the center of the air capture hole 36 and the center of the air recovery hole 37 is desired to be set longer than the width of the air bubble room 38.

By providing a guide plate 39 on the recovering side chamber 12, it is possible to smoothly acquire the air bubbles 40. The guide plate 39 is provided inside the recovering side chamber 12 in a position at which the recovering side chamber 12 overlaps with the air intake holes 36 in the view from the lower portion of the ship bottom. The guide plate 39 is provided to approach the ship bottom 4 in the direction from the side of the bow 2 to the side of the stern 3. By this guide plate 39, the air bubbles 40 acquired from the air intake holes 36 are smoothly sent to the pushing pressure generating section 35.

Figure 9:
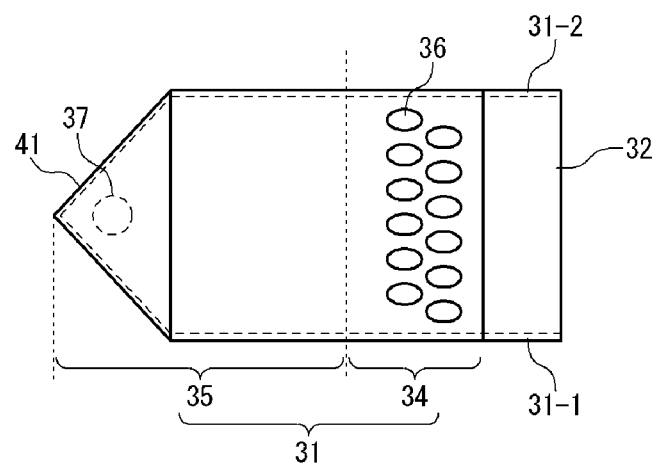
FIG. 9 is a bottom view of the recovering side chamber containing a narrowing section.
Figure 10:
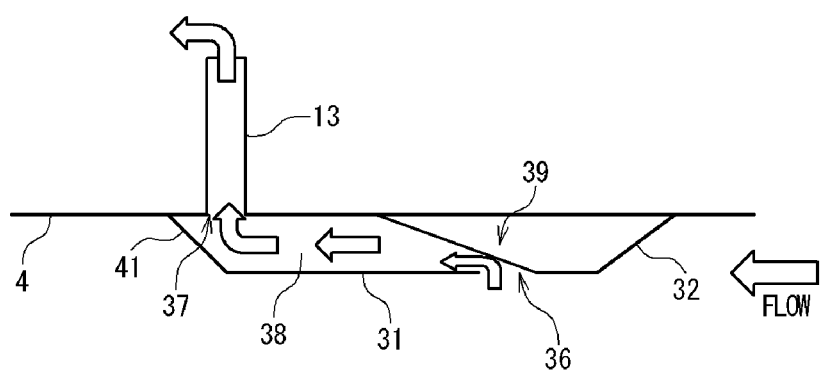
FIG. 10 is a side sectional view of the recovering side chamber containing the narrowing section.

FIGS. 9 and 10 are a bottom view and a sectional view of the recovering side chamber in a modification example of the present embodiment. In the modification example, the recovering side chamber contains a narrowing section 41 on the downstream side. In the narrowing section 41, the width of the recovering side chamber is narrowed to be gradually reduced toward the downstream side. More preferably, the narrowing section 41 is configured by a plate member which approaches the ship bottom 4 toward the downstream side, similarly to the rear end 33 in FIG. 8. The air recovery hole 37 is arranged in the upper portion in the vertical direction of the narrowing section 41. By such a configuration, the air bubbles acquired in the air bubble room 38 are easily collected in the narrowing section 41, and the air bubbles can be recovered more efficiently from the air recovery hole 37.

When the existing ship is altered to install the air lubrication system in the present embodiment, the air supply hole 27 and the air recovery hole 37 are formed in the ship bottom 4. The pipe 10, the pipe 13 and the compressor 11 are provided within the ship. The ejecting side chamber 9 and the recovering side chamber 12 are provided in the ship bottom 4. In this way, it is possible to improve the efficiency of the navigation of the existing ship. Even when the air lubrication system in the present embodiment is installed for a ship to be newly manufactured, the air lubrication system can be installed under few design changes in accordance with the similar procedure.

The configuration of the air lubrication system in the present embodiment is effective by using even the side of the air ejecting unit 7. For example, by employing an inner installation type in which similarly to the newly-manufactured ship that contains the air lubrication system, the chambers for recovering the air bubbles are formed inside the hull 1 and then attaching the ejecting side chamber 9 from the outside, the same effect as this embodiment can be attained in the air ejecting unit 7.

As mentioned above, the present invention has been described by referring to the embodiments. However, the present invention is not limited to the above-mentioned embodiments. Various modifications can be performed on the above-mentioned embodiments. For example, any combination of the above-mentioned embodiments in a range without any conflict with each other can be also considered to belong to the embodiment of the present invention.

The invention claimed is:

1. An air lubrication system comprising:
an air ejecting unit; and
an air recovering unit,
wherein said air ejecting unit comprises:
an ejecting side chamber having air ejecting holes; and
a supply section which is configured to supply air into an inner space of said ejecting side chamber,
wherein said air recovering unit comprises:
a recovering side chamber installed at a bottom of a ship at a stern side from said air ejecting unit, said recovering side chamber having an air intake hole in a surface opposite to the bottom of the ship on a lower side;
a recovering section which is configured to discharge the air inside said recovering side chamber through an air recovery hole; and
a guide plate arranged in said recovering side chamber and inclined toward the bottom of the ship in a direction from said air intake hole to said air recovery hole.

2. The air lubrication system according to claim 1, wherein said ejecting side chamber comprises a flat portion having a bottom plate, a front end portion having a slope, and a rear end portion having a slope,
wherein a first end of said front end portion is connected to said flat portion and a second end of said front end portion is connected to the bottom of the ship, and
wherein a first end of the rear end portion is connected to the bottom of the ship and a second end of the rear end portion is connected to said flat portion.

3. The air lubrication system according to claim 2, wherein said flat portion is arranged parallel to the bottom of the ship, and
wherein said air ejecting holes are configured to eject the air in a direction perpendicular to said flat portion.

4. The air lubrication system according to claim 1, wherein said supply section is configured to supply the air into the inner space of said ejecting side chamber through an air supply hole formed in the bottom of the ship, and
wherein a distance between a center of said air supply hole and said air ejecting holes along a longitudinal direction of the ship is longer than a width of said ejecting side chamber along a direction perpendicular to the longitudinal direction.

5. The air lubrication system according to claim 1, wherein said supply section is configured to supply the air into the inner space of said ejecting side chamber through an air supply hole formed in the bottom of the ship,
wherein said ejecting side chamber has an air diffusing section extending in a longitudinal direction of the ship between said air supply hole and said air ejecting holes to diffuse the air supplied from said supply section, and
wherein said air ejecting holes are arranged along a direction perpendicular to the longitudinal direction of the ship so as to eject the diffused air.

6. The air lubrication system according to claim 5, wherein said air ejecting holes are distributed in a wider area in a width direction of the ship than said air supply hole.

7. A ship comprising an air lubrication system which comprises:
an air ejecting unit which comprises:
an ejecting side chamber having air ejecting holes; and
a supply section which is configured to supply air into an inner space of said ejecting side chamber; and an air recovering unit which comprises:
- a recovering side chamber installed at a bottom of the ship on a stern side from said air ejecting unit, said recovering side chamber having an air intake hole in a surface opposite to said bottom of the ship on a lower side;
- a recovering section which is configured to discharge the air inside said recovering side chamber through an air recovery hole; and
- a guide plate arranged in said recovering side chamber and inclined toward said bottom of the ship in a direction from said air intake hole to said air recovery hole.

\* \* \* \* \*